United States Patent [19]

Sprague

[11] 4,161,967
[45] Jul. 24, 1979

[54] THERMAL SLEEVE

[75] Inventor: Theodore S. Sprague, Hudson, Ohio

[73] Assignee: The Babcock & Wilcox Company, New York, N.Y.

[21] Appl. No.: 875,023

[22] Filed: Feb. 3, 1978

[51] Int. Cl.² .............................. F16L 9/10; F16L 9/18
[52] U.S. Cl. .................................................. 138/113
[58] Field of Search ............... 138/113, 44; 239/397.5, 239/590.3; 285/158

[56] References Cited

U.S. PATENT DOCUMENTS

| 3,232,643 | 2/1966 | Mikeska | 285/158 |
| 3,436,109 | 4/1969 | Loose | 285/158 |
| 3,495,630 | 2/1970 | Hansen et al. | 138/148 |

Primary Examiner—Richard E. Aegerter
Assistant Examiner—Willis Little
Attorney, Agent, or Firm—J. M. Maguire; E. A. Mosley; R. J. Edwards

[57] ABSTRACT

A nozzle and thermal sleeve arrangement whereby the thermal sleeve maintains sealing contact with component parts of the nozzle during thermal expansion and contraction without giving rise to stress causing restraints.

4 Claims, 2 Drawing Figures

THERMAL SLEEVE

BACKGROUND OF THE INVENTION

The present invention relates to the protection of pressure vessel walls during thermal transients, and more particularly to a novel construction and arrangement of a thermal sleeve positioned in a pressure vessel nozzle.

Thermal sleeves are generally well known and are highly desirable for use in pressure vessel nozzles for protection of the pressure vessel during temperature changes of the fluid flowing to the vessel. Heretofore, thermal sleeves have usually been formed integral with or welded to the pressure vessel nozzle. Such construction gives rise to high cyclic stresses around the sleeve and nozzle juncture due to mutual restraint of the sleeve and nozzle during temperature transients. This is true even though only one end of the sleeve is attached to the nozzle. Any looseness in the sleeve to nozzle connection allows a flow of fluid to pass between the sleeve and nozzle thereby defeating the desired thermal protection with respect to the nozzle and pressure vessel wall. Other types of devices have been used where the junction between the sleeve and nozzle has been attained by mechanical arrangements, for example, by spring loading as in U.S. Pat. No. 3,232,643. Such arrangements have been generally satisfactory, but are expensive and difficult to fabricate.

SUMMARY OF THE INVENTION

The present invention relates to a fluid flow nozzle arrangement whereby the thermal sleeve maintains sealing contact with component parts of the nozzle during thermal expansion and contraction without giving rise to stress causing restraints.

Accordingly, there is provided a fluid flow nozzle which has a bore extending therethrough. A pair of axially spaced rings of equal inner diameter are disposed within the bore. Each ring has an inner peripheral end surface diverging outwardly at an angle whose tangent is equal to the ratio of the ring inner diameter to the axial length between the respective diverging end surfaces of the rings. A thermal sleeve is disposed within the bore, the sleeve has diverging end portions whose outer peripheral surfaces conform to and are in contact with the diverging end surfaces of the rings.

DESCRIPTION OF THE PREFERRED EMBODIMENT

Figure 1:
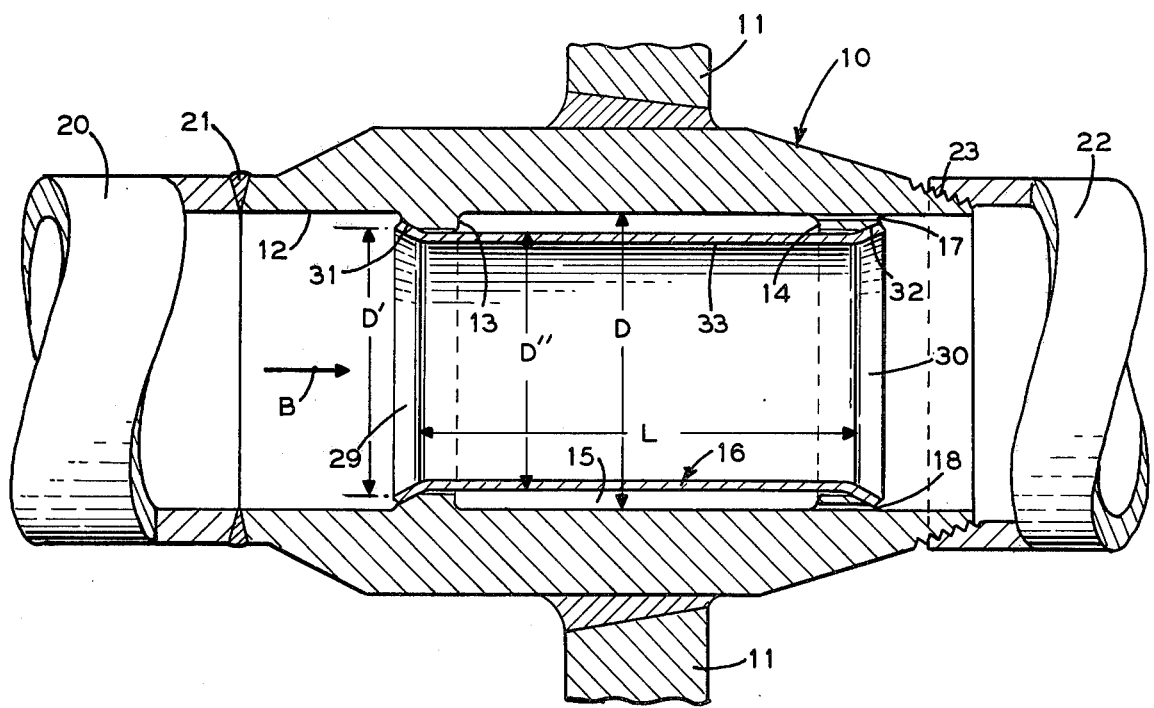
FIG. 1 is a cross-sectional side view of a nozzle and thermal sleeve constructed and arranged according to the invention.
Figure 2:
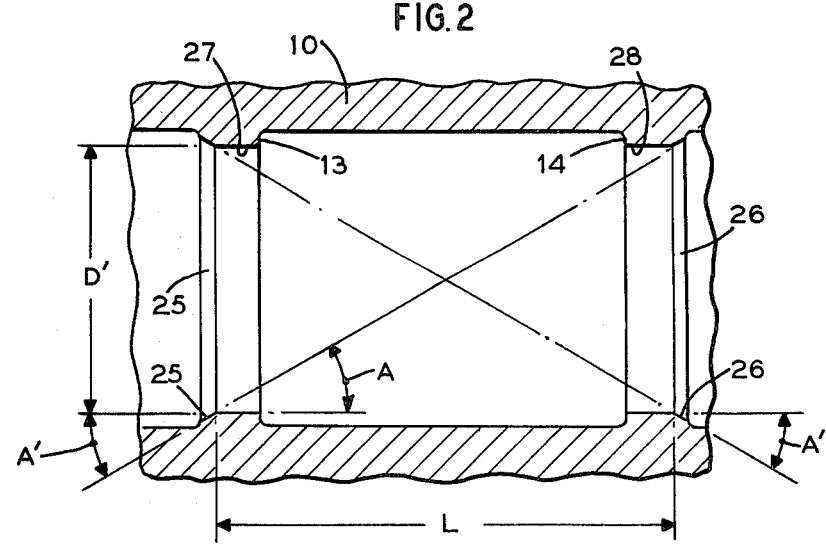
FIG. 2 is an enlarged detailed section of the nozzle bore.

There is shown in the drawings a nozzle 10 positioned in a pressure vessel wall 11 where the direction of fluid flow is illustrated by the arrow B, as being from left to right. It will be understood that the usual pressure vessel is provided with at least two nozzles for fluid inlet and outlet purposes. Those skilled in the art will understand that the bore diameter D of a nozzle is determined in accordance with the fluid flow rate to the vessel. The length of a nozzle is selected for desirable fluid flow characteristics, as determined by calculations and experience in this art.

In the illustrated embodiment, the incoming fluid passes through a pipe 20 which is welded to the inlet end of the nozzle 10, as shown at 21. The discharge end of the nozzle, interior of the wall 11, is threaded, as indicated at 23, to a pipe 22. The illustrated welded and threaded connections to the nozzle 10 are shown only for illustrative purposes and other juncture provisions can be used without effect on the construction and arrangement of the present invention. Furthermore, while the nozzle of this embodiment extends both exteriorly and interiorly of the pressure vessel wall 11, such relationship to the wall 11 is not critical insofar as the invention is concerned. In fact, the nozzle and thermal sleeve positional relationship with the pressure vessel wall shown in U.S. Pat. No. 3,232,643 could be utilized without adverse effect on the subject matter of this invention.

As shown in FIG. 1, the nozzle 10 includes an inner bore 12 having a diameter D and formed to provide a pair of inwardly projecting rings 13 and 14 disposed within the bore 12. The rings 13 and 14 are integral with the body of the nozzle 10 and are machined to have a common inner diameter D'. The rings 13 and 14 are axially spaced and positioned on opposite sides of the plane of wall 11. An annular space 15 is formed between the rings, bounded externally by the bore periphery and internally by the outer surface of a thermal sleeve 16. The ring 14, which is downstream fluid flow-wise of the ring 13, is provided with small vent and drain openings 17 and 18 to equalize pressures in the space 15 relative to the incoming fluid and the interior of the pressure vessel, not shown.

The coefficient of expansion of any particular metal alloy is known or can be determined. With the coefficient known, the expansion or contraction of a tubular member with temperature changes will follow the hypotenuse of a right triangle whose sides correspond to the diameter and length of the member. When applying this ratio to a nozzle and thermal sleeve as in the present invention, the end surfaces of associated nozzle and sleeve parts, which abut along a plane coinciding with the hypotenuse obtained in accordance with the aforementioned parameters, will accommodate differential thermal movements of the nozzle and sleeve while maintaining a leakproof seal at the interface between the abutting surfaces, thereby eliminating the need for welding.

In accordance with the invention, the respective inner peripheral end surfaces 25 and 26 of rings 13 and 14 diverge outwardly at an angle of divergence A' which is equal to angle A whose tangent is equal to the ratio of the ring inner diameter D' to the axial length L between the respective diverging end surfaces 25 and 26 of rings 13 and 14. The inner diameter D' is the same for rings 13 and 14 and is taken at the axially oriented inner peripheral surfaces 27 and 28, respectively.

The thermal sleeve 16 is of tubular configuration and has a relatively thin wall as compared with the thickness of either the pressure vessel wall 11 or the nozzle 10. For example, the sleeve wall thickness may be in the order of 1/16 inch. The sleeve 16 is formed of the same or substantially the same alloy composition as the nozzle 10 so that the coefficient of expansion of the two elements will generally be the same. The sleeve end portions 29 and 30 diverge outwardly and have respective outer peripheral surfaces 31 and 32 which conform to and are in sealng contact with the diverging end surfaces 25 and 26 of rings 13 and 14, respectively. The outer diameter D" of the axially oriented sleeve portion 33 is slightly smaller than the inner ring diameter D' to accommodate relative movement of the sleeve 16 with respect to the nozzle 10 resulting from temperature differentials.

A preferred method of assembly is to bell one sleeve end portion, as indicated at 30, to an angle of divergence equal to angle A' and to insert the sleeve 16 from inside of the pressure vessel, not shown, and to hold the belled or diverging sleeve surface 32 against the diverging end surface 26 of ring 14, while belling the opposite sleeve end portion, as indicated at 29, outside of the pressure vessel, not shown, until the diverging sleeve surfaces 31 and 32 are pre-stressed and tightly seated against the diverging end surfaces 25 and 26 of rings 13 and 14, respectively.

By way of example and not of limitation, if the given length L between the respective diverging end surfaces 25 and 26 of rings 13 and 14 is 9 inches, and the given inner diameter D' taken at the axially oriented inner peripheral ring surfaces 27 and 28 is 5.25 inches, then the tangent of angle A equals the ratio of D'/L or 5.25/9.00 or 0.5833 and the angle A is 30 degrees and 17 minutes. Accordingly, the inner peripheral surfaces of rings 13 and 14 are machined to provide outwardly tapered surfaces 25 and 26 which have an angle of divergence A' of 30 degrees and 17 minutes. The end portions 29 and 30 of sleeve 16 are belled into the machined surfaces 25 and 26 to form a leakproof seal therebetween.

A change in temperature in either an increasing or decreasing direction will result in a differential movement between the nozzle 10 and the sleeve 16 whereupon any point on the interface of the diverging end surfaces 25, 26 and 31, 32 of the rings 13 and 14 and the thermal sleeve 16, respectively, will move along the hypotenuse of the right triangle having for its sides the ring inner diameter D', and the axial length L between the respective diverging end surfaces 25 and 26 of rings 13 and 14.

While in accordance with the provisions of the statutes there is illustrated and described herein a specific embodiment of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A fluid flow nozzle having a bore extending therethrough, a pair of axially spaced rings of equal inner diameter being disposed within the bore, each ring having an inner peripheral end surface diverging outwardly at an angle whose tangent is equal to the ratio of the ring inner diameter to the axial length between the respective diverging end surfaces of the rings, and a thermal sleeve disposed within the bore, the sleeve having diverging end portions whose outer peripheral surfaces conform to and are in contact with the diverging end surfaces of said rings, whereby said thermal sleeve maintains sealing contact with component parts of the nozzle during thermal expansion and contraction without giving rise to stress causing restraints.

2. The nozzle according to claim 1 wherein the nozzle and sleeve materials have similar thermal expansion and contraction characteristics.

3. The nozzle according to claim 1 wherein the rings include axially oriented inner peripheral surfaces, and the sleeve is radially spaced from said last named surfaces.

4. The nozzle according to claim 1 wherein the ring situated downstream fluid flow-wise has a perforated annular wall.

* * * * *